United States Patent
Bechara et al.

[11] 3,843,648
[45] Oct. 22, 1974

[54] METHOD FOR PREPARING N-AMINO ALKYLATED MORPHOLINES

[75] Inventors: Ibrahim Selim Bechara, Boothwyn; Barton Milligan, Ardmore; Martin Hi Ziv, Springfield, all of Pa.

[73] Assignee: Air Products and Chemicals, Inc., Philadelphia, Pa.

[22] Filed: Sept. 11, 1972

[21] Appl. No.: 287,907

[52] U.S. Cl. .................................. 260/247.5 R
[51] Int. Cl. ..................................... C07d 87/40
[58] Field of Search ...................... 260/247.5 R

[56] References Cited
UNITED STATES PATENTS
3,527,757   12/1970   Austin et al. .................. 260/247.5

Primary Examiner—Lorraine A. Weinberger
Assistant Examiner—Richard D. Kelly
Attorney, Agent, or Firm—Richard A. Dannells, Jr.; Barry M. Yerman

[57] ABSTRACT
Amines having the formula

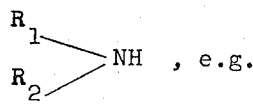

, e.g.

e.g., dimethylamine, are reacted with amino alcohols having the formula,

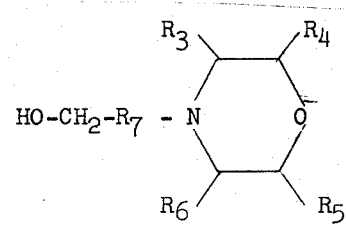

e.g., hydroxyethyl morpholine, under vapor phase and dehydration conditions in the presence of a heterogeneous catalyst to obtain high yields of N-amino alkylated morpholine, e.g., N,N-dimethylaminoethyl morpholine. Similarly, amines having the formula

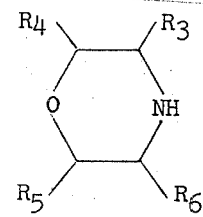

e.g., morpholine, are reacted with amino alcohols having the formula

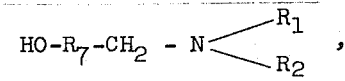

e.g., dimethylethanolamine to obtain the desired substituted morpholines. In the above formulas $R_1$ and $R_2$ are each independently alkyl groups having 1 to 4 carbon atoms, $R_3$, $R_4$, $R_5$ and $R_6$ are each independently hydrogen, a methyl group or an ethyl group and $R_7$ is an alkylene group having 1 to 4 carbon atoms.

10 Claims, No Drawings

METHOD FOR PREPARING N-AMINO ALKYLATED MORPHOLINES

BACKGROUND OF THE INVENTION

This invention relates to a method for the preparation of N-amino alkylated morpholines from amines and amino alcohols under vapor phase and dehydration conditions in the presence of a heterogeneous catalyst.

PRIOR ART

It is well known to prepare polycyclic amines such as substituted piperazine by alkylating an amine (or ammonia) with an alcohol under high pressure hydrogenation conditions. Moss et al., U.S. Pat. No. 3,151,115, examples 1–5, discloses an alkylation reaction between a monoethanolamine and ammonia in the presence of hydrogen and a nickel-copper-chromia hydrogenation catalyst at pressures of about 200 atmospheres and temperatures in the range of about 200° to 230°C to prepare aminoethylpiperazine, hydroxyethylpiperazine and piperazine. Bedoit, U.S. Pat. No. 3,115,657, discloses the use of similar hydrogenative conversion conditions for reacting diethylene glycol and ammonia for the preparation of a diglycolamine and morpholine.

It is also known to prepare substituted morpholine compounds by methylating a primary or secondary amine using formaldehyde and formic acid in the absence of a catalyst. Godfrey, U.S. Pat. 3,210,349, in Example V, discloses the preparation of 4-(2-dimethylaminoethyl)morpholine (DMAEM) from 4-(2-aminoethyl)morpholine.

It is also known to prepare substituted piperazines by cyclodehydrating an amino alcohol in the presence of an alumina catalyst. Bluestein et al., U.S. Pat. No. 3,647,795 for example, discloses vaporizing and passing N-methylethanolamine over an activated alumina at temperatures in the range of about 260° to 425°C and atmospheric pressure to produce N,N'-dimethyl piperazine.

Metal phosphates such as aluminum phosphate have been disclosed in Austin et al., U.S. Pat. No. 3,527,757 as catalysts for the alkylation of amines such as morpholine with alkyleneimines, such as ethyleneimine to form N-β-aminoethyl morpholine. The disclosed reaction requires the cracking of the C-N bond and chemical addition of the reactants rather than a dehydration reaction as in the present case.

SUMMARY OF THE INVENTION

In accordance with the present invention, it has been found that in order to produce N-amino alkylated morpholines from the following reactants

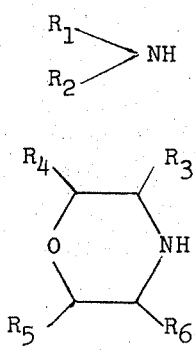

with

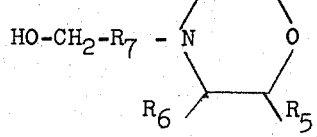

or

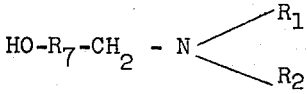

where $R_1$ and $R_2$ are each independently alkyl groups having 1 to 4 carbon atoms, $R_3$, $R_4$, $R_5$ and $R_6$ are each independently hydrogen, a methyl group or an ethyl group and $R_7$ is an alkylene group having 1 to 4 carbon atoms, one can use vapor phase and dehydrating conditions in the presence of a heterogeneous catalyst selected from the group consisting of kaolin, silica alumina, silica magnesia, silica zirconia, a crystalline zeolitic aluminosilicate, aluminum phosphate, calcium phosphate and iron phosphate. The N-amino alkylated morpholines produced by the process of this invention have the following general formula:

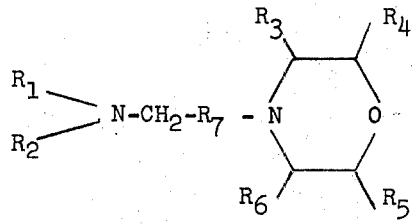

where $R_1 - R_7$ are defined above.

The reaction conditions comprise temperatures in the range of about 200°C to 400°C, pressures in the range of about 200 mm/Hg. to 2,500 mm/Hg., and liquid hourly space velocities (LHSV) in the range of about 0.05 to about 1.0 volume of reactants per hour per volume of catalyst, preferably an LHSV in the range of 0.1 to 0.4. The amine to amino alcohol molar ratio of the reactants is in the range of about 0.5:1 to about 4:1, preferably in the range of about 1:1 to 3.5:1.

Diluent gases, e.g., ammonia, may be added to the gas phase reactants to achieve an increase in the yield of product. It has been found that while certain other diluents, such as water and hydrogen, can be tolerated in the feed mixture, they do not necessarily have a beneficial effect.

The heterogeneous catalysts useful in the present process can be in the form of granules, molded pellets or beads. Silica-alumina cracking catalysts comprising 60 – 90 percent by weight $SiO_2$ and 40 – 10 percent by weight $Al_2O_3$ can be used as well as zeolitic cracking catalysts comprising an aluminosilicate matrix. Siliceous gels containing zirconia or magnesia can be substituted for all or part of the alumina. Metal phosphates including aluminum phosphate, calcium phosphate and iron phosphate are also effective as catalysts in the present process. Aluminum phosphate and acid-activated clays of the montmorillonite and kaolin cracking catalyst type are the preferred catalysts for the present process.

The resulting N-amino alkylated morpholine products find application as polyurethane catalysts, epoxy curing agents and as intermediates in the preparation of corrosion inhibitors, pharmaceuticals, emulsifiers, textile chemicals, and rubber chemicals.

The invention will be further illustrated by the following examples.

EXAMPLE 1

This example illustrates the effect pressure has on the product yield when operating in accordance with the process of the present invention.

A liquid feed comprising a 50:50 by weight mixture of morpholine (morph.) and dimethylethanolamine (DMAE) was pumped at a preset rate from a 250cc glass burette through a transfer line to a reactor inlet located near the top of the reactor and flowed downward therethrough. A piston type "mini-pump" was used to pump the liquid feed. A control valve located on the transfer line was automatically regulated to impose a pumping back-pressure of about 20 psig in order to maintain an even flow of fluid.

The reactor, mounted vertically, was a 1 inch NPS Schedule 40 stainless steel pipe approximately 3½ ft. long. The reactor contained from bottom to top, a 1 inch bed of stainless steel wool, a 3 inch chipped quartz bed, a 10 inch catalyst bed, a 16 inch chipped quartz preheat bed and an 8 inch stainless steel wool bed — the latter located in the top section containing the feed transfer lines. The catalyst used in this example was aluminum phosphate in the form of ¼-inch diameter pellets and having a packed bulk density of 0.635 kg./l.

A thermowell of ¼ inch diameter entered the reactor at the top and extended vertically downward along the reactor axis. Four thermocouples within the thermowell were connected to a temperature recorder. They are individually located so as to determine the temperature at the bottom of the chipped quartz preheat bed and at catalyst bed depths of 10, 50 and 80 percent from the top of the bed.

The reactor was electrically heated with an insulated furnace extending from below the upper stainless steel wool bed to the bottom of the lower chipped quartz bed. The furnace contained three electrical circuits. One circuit heated the top 85 percent of the quartz bed, the second circuit the bottom 15 percent of the quartz preheat bed and the upper 50 percent of the catalyst bed and the third circuit the lower 50 percent of the catalyst bed. All of the circuits were connected to separate potentiometers. The upper two circuits were also connected to automatic temperature controllers.

The reactor effluent discharged from the bottom of the reactor which was operably connected to a 500cc three-necked glass flask used as the primary product receiver. The flask was connected to a glass trap and both were immersed in a dry ice-trichloroethylene bath. Most of the reactor effluent was cooled, condensed and collected in the three-necked flask. Vapor passing through the flask was condensed in the glass trap. Reduced pressure for Run Nos. 1 and 2 shown in Table I below were maintained by means of a vacuum pump connected to this trap.

Material collected in the trap was weathered (allowed to stand at atmosphere conditions and heat up to room temperature) and then combined with the product from the flask. This total product was analyzed by vapor phase chromatography with N-methyl pyrrolidone used as an internal standard. For ease in handling the effluent in the analytical procedure, the product containing the internal standard was diluted with absolute methanol.

The operating conditions and yield data are summarized for Run Nos. 1 – 4 in Table I below. The results indicate that the minimum pressure for the production of DMAEM at these conditions is about 200 mm/Hg.

TABLE I

| Run No. | 1 | 2 | 3 | 4 |
| --- | --- | --- | --- | --- |
| Operating Conditions | | | | |
| Pressure, mm./Hg. | 100 | 300 | 760 | 1260 |
| Temp., °C | 249–255 | 249–255 | 249–255 | 249–255 |
| Space Rate, LHSV | 0.2 | 0.2 | 0.2 | 0.2 |
| Mol. Morph./mol. DMEA in feed 10 1.0:1.0 | 1.0:1.0 | 1.0:1.0 | 1.0:1.0 | |
| Reaction Time, hr. | 1 | 1 | 1 | 1 |
| Catalyst | AlPO$_4$ | AlPO$_4$ | AlPO$_4$ | AlPO$_4$ |
| Yield Data | | | | |
| Selectivity, mol. DMAEM/mol. morph.× 100 | 11 | 32 | 55.6 | 40 |
| Selectivity, mol. DMAEM/mol. DMAE × 100 | 10 | 44 | 55.6 | 60 |
| Conversion, based on morph.,mol. % | 59 | 65 | 56 | 43 |
| Conversion, based on DMEA, mol. % | 64 | 47 | 56 | 30 |
| Yield/Pass, mol. DMAEM/mol. morph.× 100 | 6.5 | 20.8 | 31.1 | 17.2 |
| Yield/Pass, mol. DMAEM/mol. DMEA × 100 | 6.4 | 20.7 | 31.1 | 18 |

EXAMPLE 2

This example illustrates the effect the simultaneous increase of the reaction temperature and space rate has on the product yield.

The same procedure was used in this example as was followed in Example 1 except that the reactor was operated at one atmosphere pressure and at the other operating conditions indicated in Table II below. The kaolin catalyst used in this example and other examples below was an activated kaolin in the pelleted form with a 0.175 inch average diameter and 0.17–0.23 inch length sold under the designation "Kaopellets" (Air Products and Chemicals, Inc.) having a bulk density of 0.78 kg./l. and a surface area of 145 sq. m./g.

The DMAEM product was recovered from the reactor effluent after a reaction time of 1 hour. The operating conditions and yield data are summarized for Run Nos. 5 – 8 in Table II below. The results indicate that as the reaction temperature and space rate were simultaneously increased with all other operating conditions remaining constant, the product selectivities expressed in terms of moles of DMAEM produced per mole of morpholine disappearance and moles of DMAEM per mole of DMAE disappearance were decreased only slightly.

EXAMPLE 4

This example illustrates the effect of increasing the ratio of moles of morpholine per mole of DMEA in the feed mixture.

The operating procedure set forth in Example II was followed in this example except as otherwise noted in Table IV below which summarizes the operating conditions and yield data for Run Nos. 13 – 16. The results

TABLE II

| Run No. | 5 | 6 | 7 | 8 |
|---|---|---|---|---|
| Operating Conditions | | | | |
| Temp., °C | 266 | 288 | 304 | 315 |
| Space Rate, LHSV | 0.09 | 0.197 | 0.265 | 0.275 |
| Mol. Morph./mol. DMEA in feed mixture | 1.0:1.0 | 1.0:1.0 | 1.0:1.0 | 1.0:1.0 |
| Reaction Time, hr. | 1 | 1 | 1 | 1 |
| Catalyst | Kaolin | Kaolin | Kaolin | Kaolin |
| Yield Data | | | | |
| Selectivity, mol. DMAEM/mol. morph.× 100 | 56.1 | 54.8 | 52.2 | 51.1 |
| Selectivity, mol. DMAEM/mol. DMAE × 100 | 42.7 | 42.8 | 39.5 | 37.3 |
| Conversion, based on morph. mol. % | 68.4 | 46.1 | 57.1 | 64.0 |
| Conversion, based on DMEA mol. % | 91.4 | 60.4 | 77.2 | 89.6 |
| Yield/Pass, mol. DMAEM/mol. morph.× 100 | 38.3 | 25.3 | 29.8 | 32.7 |
| Yield/Pass, mol. DMAEM/mol. DMAE × 100 | 39.2 | 25.8 | 30.5 | 33.4 |

EXAMPLE 3

This example is included to show the effect increasing the reaction temperature has on product yield.

indicate that the product selectivities based on both morpholine and DMEA disappearance were increased as the ratio of morpholine to DMEA in the feed mixture was increased.

TABLE IV

| Run No. | 13 | 14 | 15* | 16 |
|---|---|---|---|---|
| Operating Conditions | | | | |
| Temp., °C | 288 | 288 | 288 | 302 |
| Space Rate, LHSV | 0.20 | 0.196 | 0.20 | 0.20 |
| Mol.Morph./mol. DMEA in feed mixture | 1.0:1.0 | 1.5:1.0 | 2.0:1.0 | 2.0:1.0 |
| Catalyst | Kaolin | Kaolin | Kaolin | Kaolin |
| Yield Data | | | | |
| Selectivity, mol. DMAEM/mol. morph.× 100 | 48.6 | 53.7 | 56.8 | 53.6 |
| Selectivity, mol. DMAEM/mol. DMAE × 100 | 35.5 | 44.7 | 47.4 | 49.8 |
| Conversion, based on morph. mol. % | 70.4 | 46.9 | 37.1 | 45.7 |
| Conversion, based on DMEA mol. % | 98.7 | 84.6 | 89.0 | 98.8 |
| Yield/Pass, mol. DMAEM/mol. morph.× 100 | 34.2 | 25.2 | 21.1 | 24.5 |
| Yield/Pass, mol. DMAEM/mol. DMAE × 100 | 35.0 | 37.8 | 42.2 | 49.2 |

Note: *Feed contained 9 wt. % $H_2O$

The same procedure was used in this example as was followed in Example II except as otherwise indicated in Table III below which summarizes the operating conditions and yield data of Run Nos. 9 – 12. The results summarized in Table III indicate that as the reaction temperature was increased, the product selectivity expressed as moles of DMAEM per mole of morpholine disappearance was decreased along with an increase in the conversion and yield/pass.

EXAMPLE 5

This example shows the effect the selection of the particular heterogeneous catalyst has on the results of producing DMAEM by a gas phase reaction.

The same procedure that was followed in Example II was used in this example except as otherwise indicated in Table V below which summarizes the operating conditions and yield data of Run Nos. 17 – 28, of which Run Nos. 17 – 20 are included herein as control runs.

TABLE III

| Run No. | 9 | 10 | 11 | 12 |
|---|---|---|---|---|
| Operating Conditions | | | | |
| Temp., °C | 271 | 288 | 304 | 315 |
| Space Rate, LHSV | 0.30 | 0.30 | 0.30 | 0.292 |
| Mol. Morph./mol. DMEA in feed mixture | 2.0:1.0 | 2.0:1.0 | 2.0:1.0 | 2.0:1.0 |
| Catalyst | Kaolin | Kaolin | Kaolin | Kaolin |
| Yield Data | | | | |
| Selectivity, mol. DMAEM/mol. morph.× 100 | 61.8 | 60.5 | 54.8 | 47.7 |
| Selectivity, mol. DMAEM/mol. DMAE × 100 | 46.8 | 51.0 | 47.8 | 45.8 |
| Conversion, based on morph. mol. % | 29.3 | 29.2 | 41.3 | 47.7 |
| Conversion, based on DMEA mol. % | 77.3 | 69.2 | 97.6 | 99.6 |
| Yield/Pass, mol. DMAEM/mol. morph.× 100 | 18.1 | 17.6 | 22.6 | 22.8 |
| Yield/Pass, mol. DMAEM/mol. DMAE × 100 | 36.2 | 35.3 | 46.7 | 45.6 |

The results indicate that the proper selection of the catalysts is critical to maintaining the desired product selectivity, expressed as moles of DMAEM per mole of morpholine disappearance, of greater than 25 percent and preferably greater than 50 percent. As is indicated in Table V, the selection of alumina for this purpose did not result in the desired selectivity. The selection of the silica-alumina cracking catalyst produced marginal results with respect to catalyst selectivity. The use of either kaolin or aluminum phosphate resulted in catalyst selectivities in the preferred range. The aluminum phosphate used in this example is in the form of ¼-inch diameter pellets having a packed bulk density of 0.635 kg./l.

The results of this example also indicate that the product selectivities were increased as the space velocities were increased as illustrated by comparing the results of Run Nos. 25, 26, and 27.

Torr. The purity of the heart cut was found to be 94 percent DMAEM.

It has been found that it is preferred to operate the above-described process for the production of DMAEM so that the initial temperature of the reaction is maintained in the range of about 250° to 290°C and the temperature is continuously or periodically adjusted during the reaction period to a final reaction temperature in the range of about 295° to 330°C. Operating in this manner results in a relatively constant product selectivity of at least 50 mole percent DMAEM based on morpholine disappearance from the feed mixture and a conversion of at least 50 mole percent based on the moles of morpholine converted per mole DMEA in the feed mixture. This increase in the reaction temperature compensates for the loss of catalyst activity during the reaction period.

TABLE V

| Run No. | 17 (Control) | 18 (Control) | 19 (Control) | 20 (Control) | 21 | 22 | 23 |
|---|---|---|---|---|---|---|---|
| Operating Conditions | | | | | | | |
| Temp., °C | 288 | 330 | 260 | 288 | 260 | 288 | 288 |
| Space Rate, LHSV | 0.20 | 0.30 | 0.15 | 0.15 | 0.195 | 0.307 | 0.15 |
| Mol. Morph./mol. DMEA in feed mixture | 2.0:1.0 | 2.0:1.0 | 2.0:1.0 | 2.0:1.0 | 2.0:1.0 | 1.0:1.0 | 2.0:1.0 |
| Catalyst | Alumina[1] | Alumina[1] | Alumina[2] | Alumina[2] | Silica-Alumina[3] | Silica Alumina[3] | Kaolin |
| Yield Data | | | | | | | |
| Selectivity, mol. DMAEM/ mol. morph. × 100 | 6.4 | 3.4 | 3.2 | 3.7 | 26.9 | 30.0 | 50.0 |
| Selectivity, mol. DMAEM/ mol. DMAE × 100 | N.A.[5] | N.A. | N.A. | N.A. | N.A. | N.A. | 47.9 |
| Conversion, based on morph., mol. % | 43.3 | 62.1 | 7.7 | 27.2 | 53.3 | 69.1 | 47.8 |
| Conversion, based on DMEA, mol. % | N.A. | N.A. | N.A. | N.A. | N.A. | N.A. | 100. |
| Yield/Pass, mol. DMAEM/ mol. morph. × 100 | 2.8 | 2.1 | 0.2 | 1.0 | 14.3 | 20.7 | 23.9 |
| Yield/Pass, mol. DMAEM/ mol. DMEA × 100 | N.A. | N.A. | N.A. | N.A. | N.A. | N.A. | 47.9 |

| Run No. | 24 | 25 | 26 | 27 | 28[4] |
|---|---|---|---|---|---|
| Operating Conditions | | | | | |
| Temp., °C | 288 | 288 | 288 | 288 | 288 |
| Space Rate, LHSV | 0.265 | 0.185 | 0.252 | 0.285 | 0.247 |
| Mol. Morph./mol. DMEA | 2.0:1.0 | 2.0:1.0 | 2.0:1.0 | 2.0:1.0 | 2.0:1.0 |
| Catalyst | Kaolin | AlPO$_4$ | AlPO$_4$ | AlPO$_4$ | AlPO$_4$ |
| Yield Data | | | | | |
| Selectivity, mol. DMAEM/mol. morph.× 100 | 58.2 | 46.4 | 51.5 | 53.1 | 53.0 |
| Selectivity, mol. DMAEM/mol. DMAE × 100 | 49.3 | 46.4 | 47.0 | 48.3 | 47.9 |
| Conversion, based on morph., % | 33.5 | 49.2 | 43.2 | 42.9 | 38.3 |
| Conversion, based on DMEA, mol. % | 79.2 | 98.5 | 94.6 | 94.3 | 84.8 |
| Yield/Pass, mol. DMAEM/mol. morph.× 100 | 19.5 | 22.8 | 22.3 | 22.8 | 20.3 |
| Yield/Pass, mol. DMAEM/mol. DMEA × 100 | 39.0 | 45.7 | 44.5 | 45.6 | 40.6 |

Notes: [1] Purchased from Aluminum Company of Amercia under the designation "H-15"
[2] Purchased from Kaiser Corp. under the designation "KCSAS" alumina spheres, ¼" × 6 mesh.
[3] Purchased from Davison Chemical Co. under the designation "Grade 979"
[4] Feed contained 9% water
[5] Not available.

EXAMPLE 6

A 50:50 weight percent feed mixture of morpholine and dimethylethanolamine was reacted at one atmosphere pressure and an initial temperature of 282°C to a final temperature of 315°C during the reaction period of 68 hours over Kaopellets at an LHSV of 0.25. The reaction system consisted of 4 adiabatic reactors in series with a preheat section to vaporize the feed mixture and 3 interstage heaters located between each of the reactors. The overall liquid recovery was 97.6 percent. The amount of DMAEM in the effluent was found to be 28 wt. percent by gas chromatography. The effluent was distilled in a 60 theoretical plate column and a heart cut was taken off at 132° – 143°C at 100–140

EXAMPLE 7

A vaporized feed mixture comprising 40:60 percent by weight (molar ratio of 2:1) of dimethylamine and hydroxyethyl morpholine was passed over a catalyst bed of Kaopellets at 1 atmosphere pressure, a temperature in the range of 293°C to 310°C and an LHSV of 0.273. The reactor system was the same as that described in Example 1. The total weight of the feed was 35 grams and the amount of the liquid effluent was 35 grams. The DMAEM product was recovered from the effluent after a 1 hour reaction period. The mole percent conversion to DMAEM for the dimethylamine was 77 percent and for the hydroxyethyl morpholine was 81.4 percent. The mole percent selectivity of the DMAEM based on dimethylamine disappearance was 31.3 percent and based on hydroxyethyl morpholine disappearance was 51.5 percent.

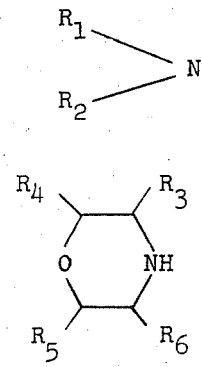

EXAMPLE 8

A vaporized feed mixture comprising 1.65 parts by weight of dimethylamine and 1.0 part of hydroxyethyl morpholine was passed over a packed bed of aluminum phosphate at one atmosphere pressure and a temperature of 288°C. The mole percent conversion of the hydroxyethyl morpholine in the feed to DMAEM was found to be 40% and the selectivity of the DMAEM based on the hydroxyethyl morpholine disappearance was found to be 49 mole percent.

EXAMPLE 9

A vaporized feed mixture comprising 50:50 percent by weight of 3-dimethylaminopropanol and 2,6-dimethyl morpholine is passed over a packed bed of kaolin cracking catalyst at one atmosphere pressure and 350°C to yield 4[3-dimethylamino propyl]-2,6-morpholine.

The foregoing disclosure of this invention is not considered to be limiting since variations can be made by those skilled in the art without departing from the scope and spirit of the appended claims.

What is claimed is:

1. A method for preparing N-amino alkylated morpholines having the general formula

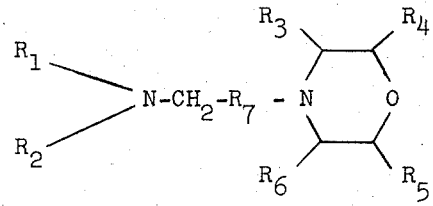

which consists of reacting, under vapor phase and dehydration conditions comprising temperatures in the range of about 200° to 400°C, pressures in the range of about 200 mm/Hg to 2,500 mm/Hg and a space velocity of 0.05 – 1.0 volumes of reactants per hour per volume of catalyst in the presence of a heterogeneous cracking catalyst selected from the group consisting of kaolin, silica alumina, silica magnesia, silica zirconia, a crystalline zeolitic aluminosilicate, aluminum phosphate, calcium phosphate, and iron phosphate, the following reactants

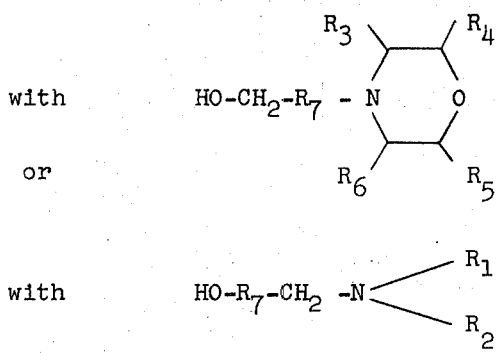

where $R_1$ and $R_2$ are each independently alkyl groups having 1 to 4 carbon atoms, $R_3$, $R_4$, $R_5$ and $R_6$ are each independently hydrogen, a methyl group or an ethyl group and $R_7$ is an alkylene group having 1 to 4 carbon atoms and recovering the N-amino alkylated morpholine product from the resulting effluent.

2. The method of claim 1 wherein either 0.5 to 4 moles of dimethylamine are reacted with 1 mole of hydroxyethyl morpholine or 0.5 to 4 moles of morpholine are reacted with 1 mole of dimethylethanolamine and the product is N,N-dimethylaminoethyl morpholine.

3. The method of claim 1 wherein the catalyst is a kaolin cracking catalyst.

4. The method of claim 1 wherein the catalyst is aluminum phosphate.

5. The method of claim 1 wherein ammonia is used as a diluent.

6. A method for preparing N-amino alkylated morpholines having the general formula

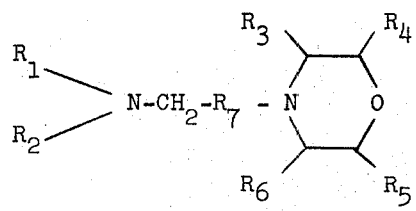

which consists of reacting 0.5 to 3 moles of a vaporized amine of

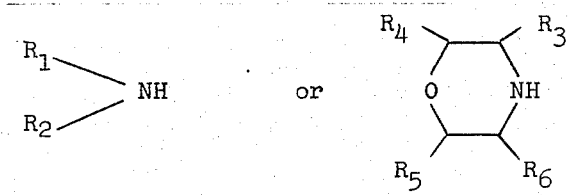

with 1 mole of a vaporized alcohol of

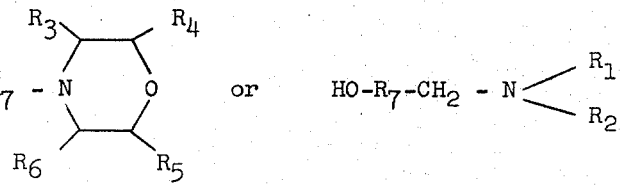

respectively where $R_1$ and $R_2$ are each independently alkyl groups having 1 to 4 carbon atoms, $R_3$, $R_4$, $R_5$ and $R_6$ are each independently hydrogen, a methyl group or an ethyl group and $R_7$ is an alkylene group having 1 to 4 carbon atoms in the presence of a heterogeneous cracking catalyst selected from the group consisting of kaolin, silica alumina, silica magnesia, silica zirconia, a crystalline zeolitic aluminosilicate, aluminum phosphate calcium phosphate, and iron phosphate at conditions to maintain each of the reactants in its vaporized state comprising temperatures in the range of about 200° to 400°C, pressures in the range of about 200 mm/Hg to 2,500 mm/Hg and a space velocity of 0.05 – 1.0 volumes of reactants per hour per volume of catalyst and recovering the N-amino alkylated morpholine product from the resulting effluent.

7. The method of claim 6 wherein 1 to 2.5 moles of dimethylamine or morpholine is reacted with 1 mole of hydroxyethyl morpholine or dimethylethanolamine, respectively and the product is N,N-dimethylaminoethyl morpholine.

8. The method of claim 7 wherein the temperature is gradually increased from an initial temperature in the range of about 250° to 290° to a final temperature in the range of about 295° to 330°C.

9. The method of claim 6 wherein the catalyst is a kaolin cracking catalyst.

10. The method of claim 6 wherein the catalyst is aluminum phosphate.

\* \* \* \* \*